US009280259B2

(12) United States Patent
Mankowski (10) Patent No.: US 9,280,259 B2
(45) Date of Patent: Mar. 8, 2016

(54) SYSTEM AND METHOD FOR MANIPULATING AN OBJECT IN A THREE-DIMENSIONAL DESKTOP ENVIRONMENT

(71) Applicant: BLACKBERRY LIMITED, Waterloo (CA)

(72) Inventor: Peter Mankowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 264 days.

(21) Appl. No.: 13/952,137

(22) Filed: Jul. 26, 2013

(65) Prior Publication Data

US 2015/0033191 A1    Jan. 29, 2015

(51) Int. Cl.
*G06T 15/00* (2011.01)
*G06F 3/0481* (2013.01)

(52) U.S. Cl.
CPC ............ *G06F 3/04815* (2013.01); *G06T 15/00* (2013.01)

(58) Field of Classification Search
None
See application file for complete search history.

(56) References Cited

U.S. PATENT DOCUMENTS

| | | | |
|---|---|---|---|
| 6,023,277 A * | 2/2000 | Osaka | G02B 27/2214 345/419 |
| 6,064,354 A | 5/2000 | DeLuca | |
| 6,559,813 B1 | 5/2003 | DeLuca et al. | |
| 6,822,635 B2 | 11/2004 | Shahoian et al. | |
| 7,148,875 B2 | 12/2006 | Rosenberg et al. | |
| 8,063,893 B2 | 11/2011 | Rosenberg et al. | |
| 8,279,168 B2 | 10/2012 | Glomski et al. | |
| 8,416,187 B2 | 4/2013 | Margolis et al. | |
| 8,432,390 B2 | 4/2013 | Givon | |
| 8,493,354 B1 | 7/2013 | Birnbaum et al. | |
| 8,494,497 B2 | 7/2013 | Seo et al. | |
| 2003/0058265 A1 | 3/2003 | Robinson et al. | |
| 2003/0184574 A1 | 10/2003 | Phillips et al. | |
| 2005/0277448 A1 | 12/2005 | Castaneda et al. | |
| 2007/0103449 A1 | 5/2007 | Laitinen et al. | |
| 2007/0139391 A1 | 6/2007 | Bischoff | |
| 2008/0068348 A1 | 3/2008 | Rosenberg et al. | |
| 2008/0153554 A1 | 6/2008 | Yoon et al. | |

(Continued)

FOREIGN PATENT DOCUMENTS

CA        2708673        12/2010
EP        2270627 A1     1/2011

(Continued)

OTHER PUBLICATIONS http://wn.wikipedia.org/wiki/Autosteroscopy—published at least as early as Nov. 2010.

(Continued)

*Primary Examiner* — Daniel Hajnik
(74) *Attorney, Agent, or Firm* — Conley Rose, P.C.; J. Robert Brown, Jr.

(57) ABSTRACT

An electronic device, method and interface for the device, for performing an action with a processor through a three-dimensional desktop environment is disclosed. A three-dimensional desktop environment is generated by a display and projected into a real space. At least one ultrasonic transducer propagates an ultrasonic pulse into the real space and receives a reflection of the ultrasonic pulse from a user object in the real space. A user action of the user object within the three-dimensional desktop environment is determined using the reflection of the ultrasonic pulse. The processor performs the action based on the determined user action.

20 Claims, 7 Drawing Sheets

(56) References Cited

U.S. PATENT DOCUMENTS

| | | | |
|---|---|---|---|
| 2008/0252595 A1* | 10/2008 | Boillot | 345/156 |
| 2009/0018445 A1 | 1/2009 | Schers et al. | |
| 2009/0058829 A1 | 3/2009 | Kim et al. | |
| 2009/0077504 A1 | 3/2009 | Bell et al. | |
| 2009/0102805 A1 | 4/2009 | Meijer et al. | |
| 2009/0160813 A1 | 6/2009 | Takashima et al. | |
| 2009/0267892 A1 | 10/2009 | Faubert | |
| 2009/0267920 A1 | 10/2009 | Faubert et al. | |
| 2009/0294186 A1 | 12/2009 | Fontanella et al. | |
| 2009/0322496 A1 | 12/2009 | da Costa | |
| 2010/0020036 A1 | 1/2010 | Hui et al. | |
| 2010/0033479 A1 | 2/2010 | Hirayama et al. | |
| 2010/0066662 A1 | 3/2010 | Tomisawa et al. | |
| 2010/0095206 A1 | 4/2010 | Kim | |
| 2010/0110018 A1 | 5/2010 | Faubert et al. | |
| 2010/0156814 A1 | 6/2010 | Weber et al. | |
| 2010/0156818 A1 | 6/2010 | Burrough et al. | |
| 2010/0225734 A1 | 9/2010 | Weller et al. | |
| 2011/0001707 A1 | 1/2011 | Faubert et al. | |
| 2011/0119639 A1 | 5/2011 | Tartz | |
| 2011/0138277 A1 | 6/2011 | Grant et al. | |
| 2011/0141046 A1 | 6/2011 | Sato et al. | |
| 2011/0195782 A1 | 8/2011 | Mao et al. | |
| 2011/0205151 A1 | 8/2011 | Newton et al. | |
| 2012/0001875 A1 | 1/2012 | Li et al. | |
| 2012/0068957 A1 | 3/2012 | Puskarich et al. | |
| 2012/0162384 A1* | 6/2012 | Vesely et al. | 348/47 |
| 2012/0229400 A1 | 9/2012 | Birnbaum et al. | |
| 2012/0293513 A1* | 11/2012 | Krishnaswamy | 345/423 |
| 2014/0160087 A1 | 6/2014 | Mercea et al. | |

FOREIGN PATENT DOCUMENTS

| | | |
|---|---|---|
| EP | 2518590 A1 | 10/2012 |
| JP | 2005258666 | 9/2005 |
| JP | 2009515351 A | 4/2009 |
| WO | 2004025517 A1 | 3/2004 |
| WO | 2009099280 A2 | 8/2009 |

OTHER PUBLICATIONS

Canadian office action for corresponding Canadian Patent Application No. 2,708,673, dated Feb. 19, 2013, 2 pages.
http://techon.nikkeibp.co.jp/english/NEWS_EN/20090310/166952/?P=11—published Mar. 11, 2009.
http://www.immersence.info/—published at least as early as Nov. 2010.
http://www.japantrends.com/tobidasu-3d-table-menu-from-tec/—published Mar. 12, 2008.
Korean first office action for Korean Patent Application No. 10-2010-0060536, dated Dec. 19, 2011, plus English transaction, 13 pages.
http://wn.wikipedia.org/wiki/Lenticular-lens—published at least as early as Nov. 2010.
http://silkehilsing.de/impress/blog/—published May 24, 2009.
http://singularityhub.com/2009/11/13/haptic-ring-lets-you-feel-objects-in-augmented-reality-video/—published Nov. 13, 2009.
https:/wiki.cc.gatech.edu/ccg/_media/classes/7570/7470-f06/gwpaper.pdf?id=classes:7570:7470-f06:projects_ii&cache=cache—published at least as early as Nov. 2010.
Amemiya, Tomohiro, et al.; "Phantom-Drawn: Direction Guidance Using Rapid and Asymmetric Acceleration Weighted by Nonlinearity of Perception"; ICAT; 2005; 8 pages.
Hoggan, Eve, et al.; "Mobile Multi-Actuator Tactile Displays"; HAID; 2007; 12 pages.
Nakamura, Norio, et al.; "Development of a Force and Torque Hybrid Display "GyroGubeSick""; IEEE; 2005; 2 pages.
European Extended Search Report; Application No. 14184405.0; Jan. 21, 2015; 13 pages.
European Search Report; Application No./Patent No. 13178166.8-1972; Date of Mailing: Jun. 13, 2014; pp. 1-12.
Mankowski, Peter; U.S. Appl. No. 14/024,006, filed Sep. 11, 2013; Title: Three Dimensional Haptics Hybrid Modeling.
Office Action dated May 22, 2015; U.S. Appl. No. 14/024,006, filed Sep. 11, 2013; 39 pages.
Final Office Action dated Dec. 3, 2015; U.S. Appl. No. 14/024,006, filed Sep. 11, 2013; 49 pages.

* cited by examiner

Figure 9

SYSTEM AND METHOD FOR MANIPULATING AN OBJECT IN A THREE-DIMENSIONAL DESKTOP ENVIRONMENT

BACKGROUND

A computer uses a desktop environment to enable a user to visually interact with an operating system of the computer. Desktop environments allow the user to move items within a two-dimensional surface, which is generally defined by a display on a monitor of the computer. In some cases, the desktop environment may be designed to give an illusion of depth to provide a three-dimensional experience for the user. However, despite this illusion of depth, the interaction typically remains a two-dimensional interaction. By providing a true three-dimensional desktop environment, it is possible for a user to interact with the computer in an entirely new way.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
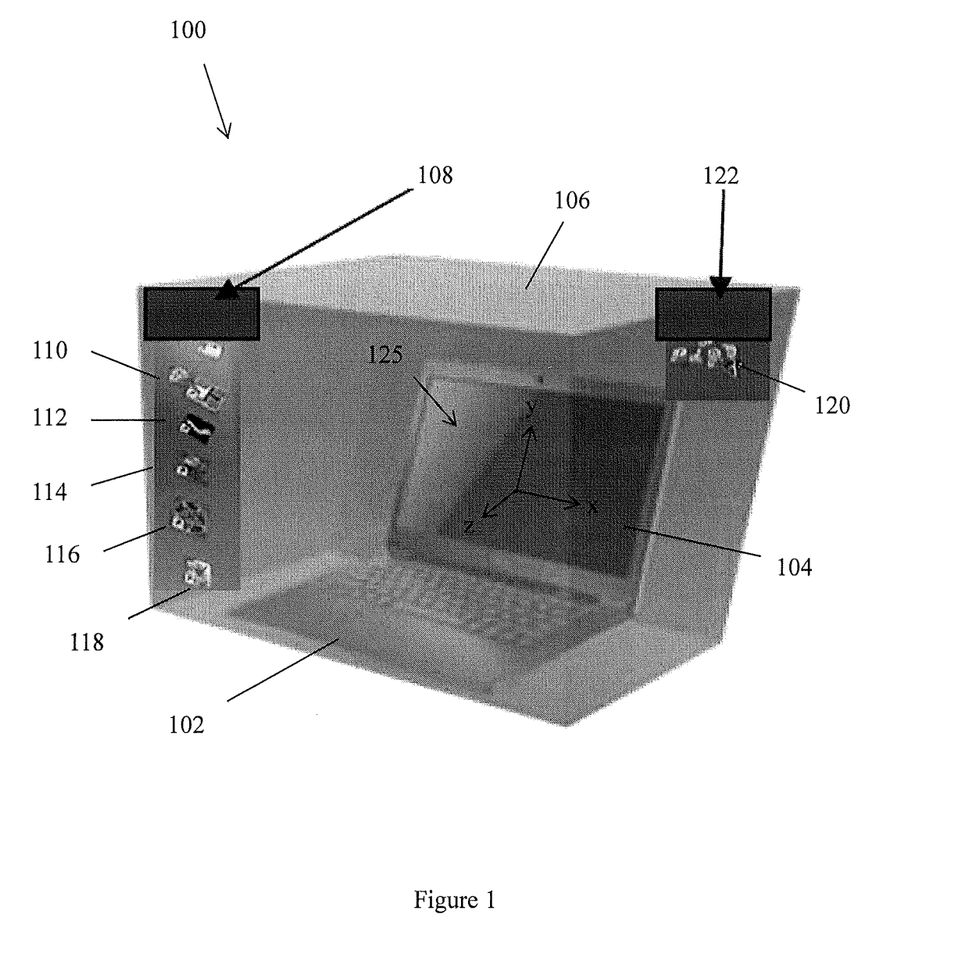
FIG. 1 shows an illustrative three-dimensional desktop environment of a suitable device having a processor.

FIG. 1 shows an illustrative three-dimensional desktop environment 100 of a device 102, which device 102 may include a phone such as a smartphone having a video display, a tablet, a laptop computer, a desktop computer, or a television or monitor in communication with a processor, in various embodiments. The three-dimensional desktop environment 100 is a three-dimensional space 106 that is defined with respect to the device 102. The device 102 includes a display 104 that is capable of projecting an image so as to appear to be located at a given position within the three-dimensional space 106. In various embodiments, the projected image may be an interactive image such as an icon that, when selected by a user, produces an action at the device 102 or within the desktop environment 100, such as starting an application, performing an action related to an operating system of the device 102 or other suitable action.

For illustrative purposes only, the three-dimensional space 106 is shown as having a cube-like volume corresponding to the device 102. A coordinate system 125 may be defined over the space 106. In general, the coordinate system 125 may be defined with respect to the display 104 which generates the three-dimensional desktop environment 100. One direction such as a z-direction of the coordinate system 125 extends perpendicularly out of display 104, with z=0 defined at a surface of the display 104. The x-direction is generally oriented along a horizontal axis of the display 104 and the y-direction is generally oriented along a vertical axis of the display 104.

Icons displayed within the desktop environment 100 may be either isolated icons or grouped icons. In FIG. 1, for example, a first group of icons 110, 112, 114, 116 and 118 are displayed at a location within the three-dimensional space 106 distal to and on a left side of the display 104 as seen by a viewer. Also, single icon 120 is displayed at a location within the three-dimensional space 106 proximate the display 104 and on a right side thereof as seen by the viewer. Tag 108 is associated with the first group of icons 110, 112, 114, 116 and 118 such that a user may be able to perform an action on all of icons 110, 112, 114, 116 and 118 by selecting the tag 108 and performing the action on the tag 108. Tag 120 is similarly associated with icon 122.

Since the three-dimensional desktop environment 100 is projected into a three-dimensional space 106 existing in real space, a user may move a user object such as a hand or a stylus, pointer, wand, etc., within the three-dimensional space 106. In various embodiments, at least one ultrasonic transducer may be used to determine a location of the user object within the three-dimensional space 106. Thus, the user may be enabled to employ the user object to interact with the three-dimensional desktop environment 100 as well as with an image or icon within the three-dimensional desktop environment 100, as discussed below.

Figure 2:
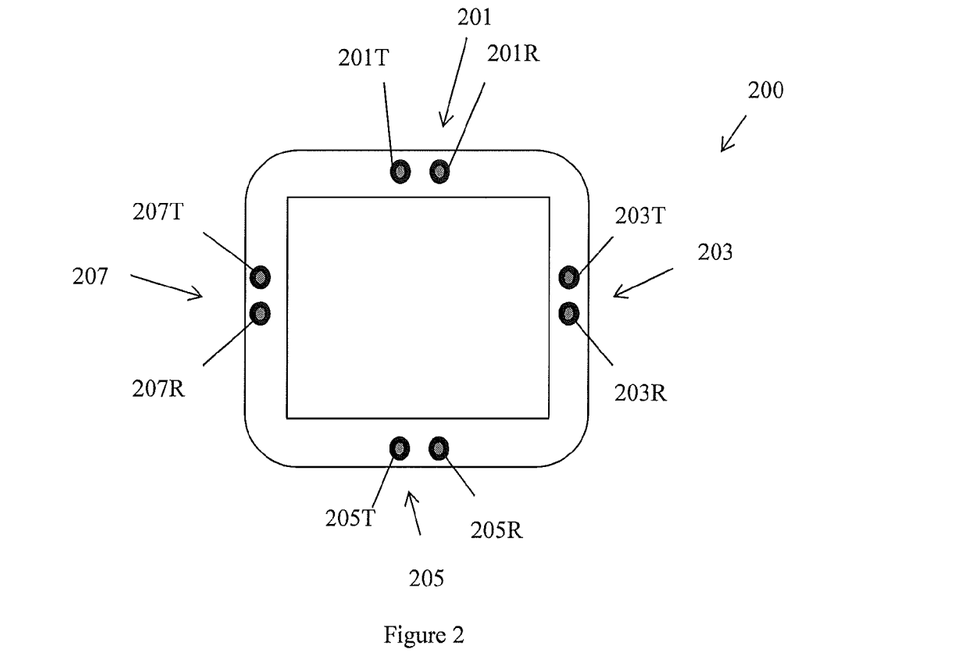
FIG. 2 shows an illustrative display of the device of FIG. 1 having a configuration of transducers that may be used for determining a location of a user object in real space with respect to the display.

FIG. 2 shows an illustrative display 200 having ultrasonic transducers that are configured to transmit and receive signals used for determining a location of a user object in real space with respect to the display. The illustrative display 200 includes four transducers 201, 203, 205 and 207. Transducer 201 includes a transmitter 201T and a receiver 201R. Similarly, transducer 203 includes transmitter 203T and receiver 203R, transducer 205 includes transmitter 205T and receiver 205R, and transducer 207 includes transmitter 207T and receiver 207R.

Figure 3:
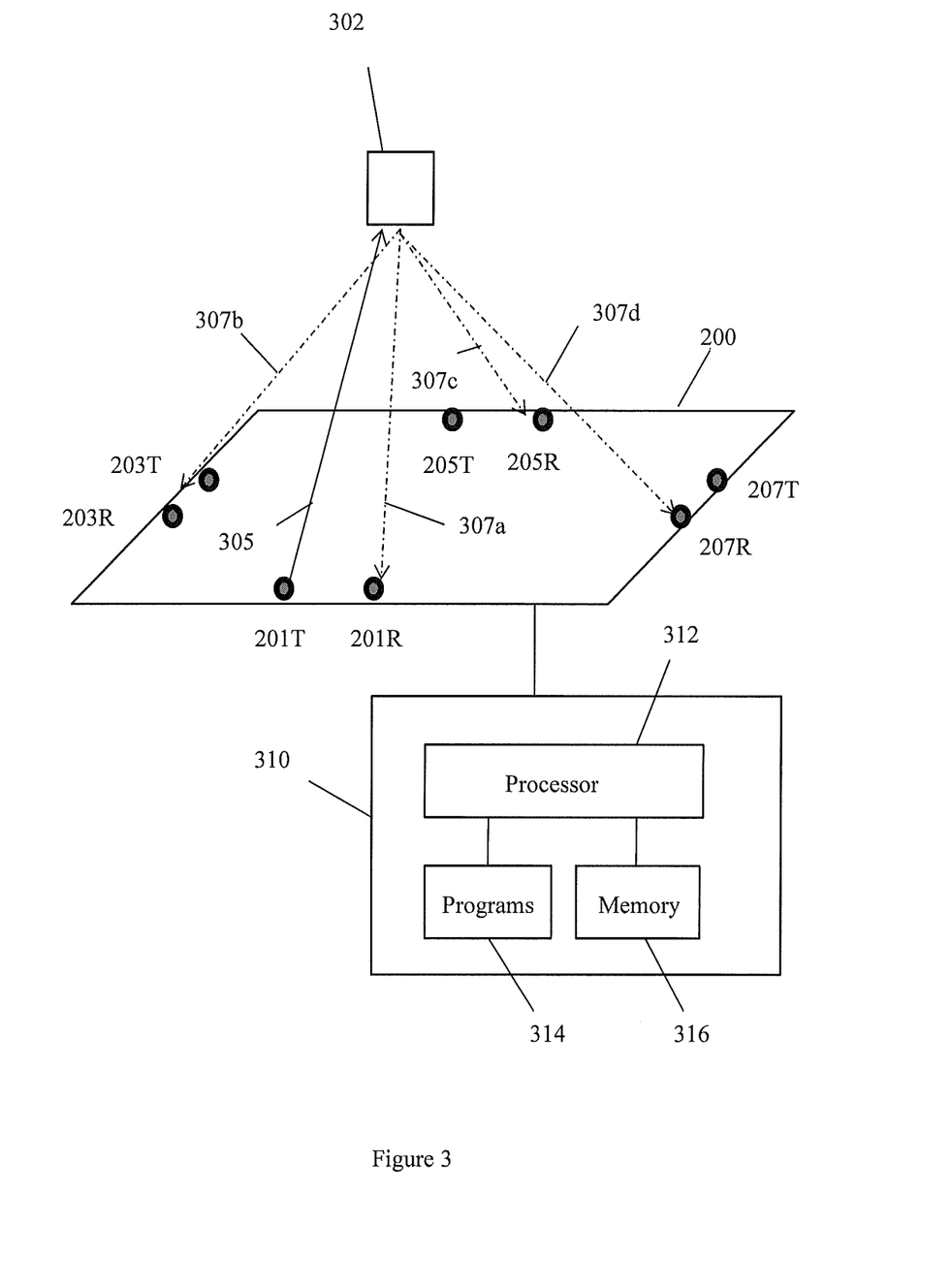
FIG. 3 illustrates use of the transducer configuration of FIG. 2 to determine a location of the user object with respect to the display.

FIG. 3 is a schematic showing the transducer configuration of FIG. 2 to determine a location of a user object 302 with respect to display 200. Display 200 may be coupled to a control module 310 including a processor 312, programs 314 and memory location 316. Transducer signals may be processed at the processor 312 according to various programs 314 in order to perform various actions of the disclosure, including determining a relative location of the user object 302 with respect to display 200, determining a movement or an action taken at the user object 302 and performing an action within the desktop environment based on the measured movement or action. Various image parameters, transducer signal times, etc., may be stored at the memory location 316. In order to locate the user object 302, transmitter 201T generates an ultrasonic pulse 305 at a selected time, which time is recorded by the control module 310. The generated ultrasonic pulse 305 is propagated into the three-dimensional space in front of the display 200. The user object 302 in the space in front of the display 200 reflects the generated ultrasonic pulse ("reflected ultrasonic pulse"), which propagates back towards the display 200. Receiver 201R receives the reflected ultrasonic pulse 307a and a time at which the reflected ultrasonic pulse 307a is received is recorded. Processor 312 determines a time difference between the time at which the ultrasonic pulse 305 is propagated by the transmitter 201T into the three-dimensional space and the time at which the reflected ultrasonic pulse 307a is received by the receiver 201R, and determines a perpendicular distance along the z-axis between the display 200 and the user object 302 based on the determined time and a known speed of sound.

Additionally, receivers 203R, 205R and 207R of the other transducers 203, 205 and 207 can receive ultrasonic pulses 307b, 307c and 307d, respectively, that are reflected from the user object 302 corresponding to the generated ultrasonic pulse 305 from transmitter 201T. Time delays between generating the ultrasonic pulse 305 and receiving the reflected pulses 307b, 307c and 307d may also be recorded. Due to known spatial distances between transmitter 201T and receivers 203R, 205R and 207R, time delays determined for each of these transmitter-receiver pairings may be used to determine a horizontal and vertical distance (i.e., x-coordinate and y-coordinate) of the user object 302 with respect to the display 200.

In addition to measuring reflected pulses that are based on the ultrasonic pulse generated at transmitter 201T, this method of determining a spatial relation of the user object to the display may be implemented using the other transmitters 203T, 205T and 207T. Thus, the transmitters and receivers of each ultrasonic transducer 201, 203, 205 and 207 may be used in any suitable combination to determine the location of the user object 302. Additionally, transmitters 201T, 203T, 205T and 207T may be activated in a selected pattern. In one embodiment, the relative location of the user object 302 may be determined by triangulation of the distances determined using any or all of the ultrasonic transducers 201, 203, 205 and 207.

In addition to determining a location of the user object 302, the signals transmitted and received by ultrasonic transducers 201, 203, 205 and 207 may be used to determine a user action by the user object 302. A user action may include, for example, a position of the user object 302, a motion of the user object 302 with respect to the device 110, and/or a gesture or movement of the user object 302. The processor 312 may interpret the user action and perform a corresponding action based upon the user action.

Figure 4:
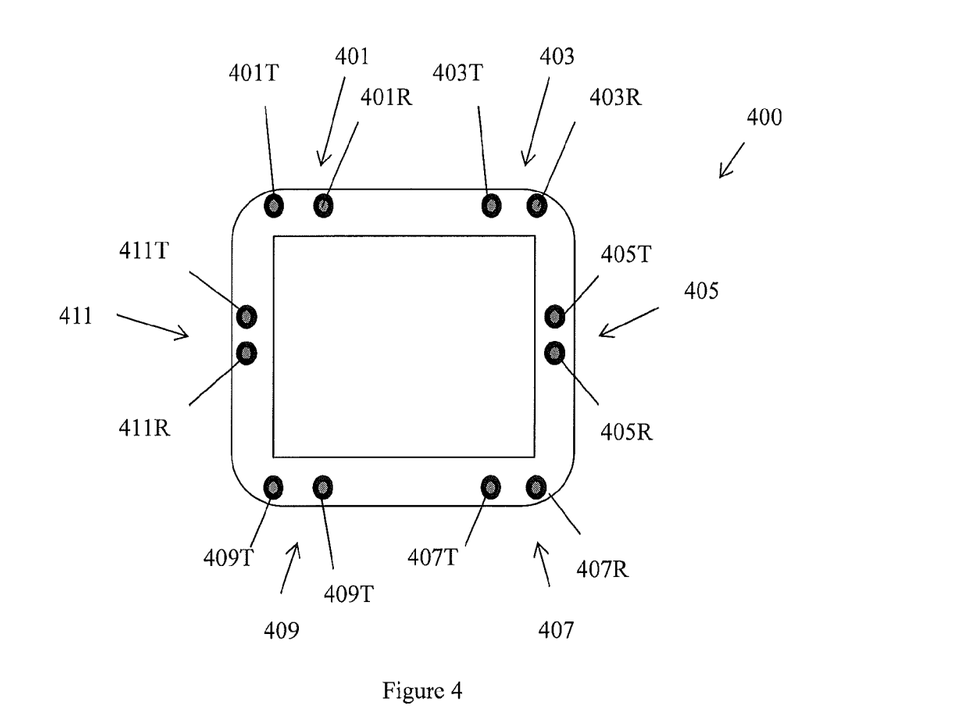
FIG. 4 shows a display having an alternative configuration of transducers.

FIG. 4 depicts a display 400 having an alternative configuration of transducers. The alternative configuration includes six transducers 401, 403, 405, 407, 409 and 411, each transducer having a transmitter and receiver (401T, 401R), (403T, 403R), (405T, 405R), (407T, 407T), (409T, 409R) and (411T, 411T), respectively. In general, increasing the number of transducers can provide for determining the location of the user object 302 at a higher resolution within the three-dimensional space.

Figure 5:
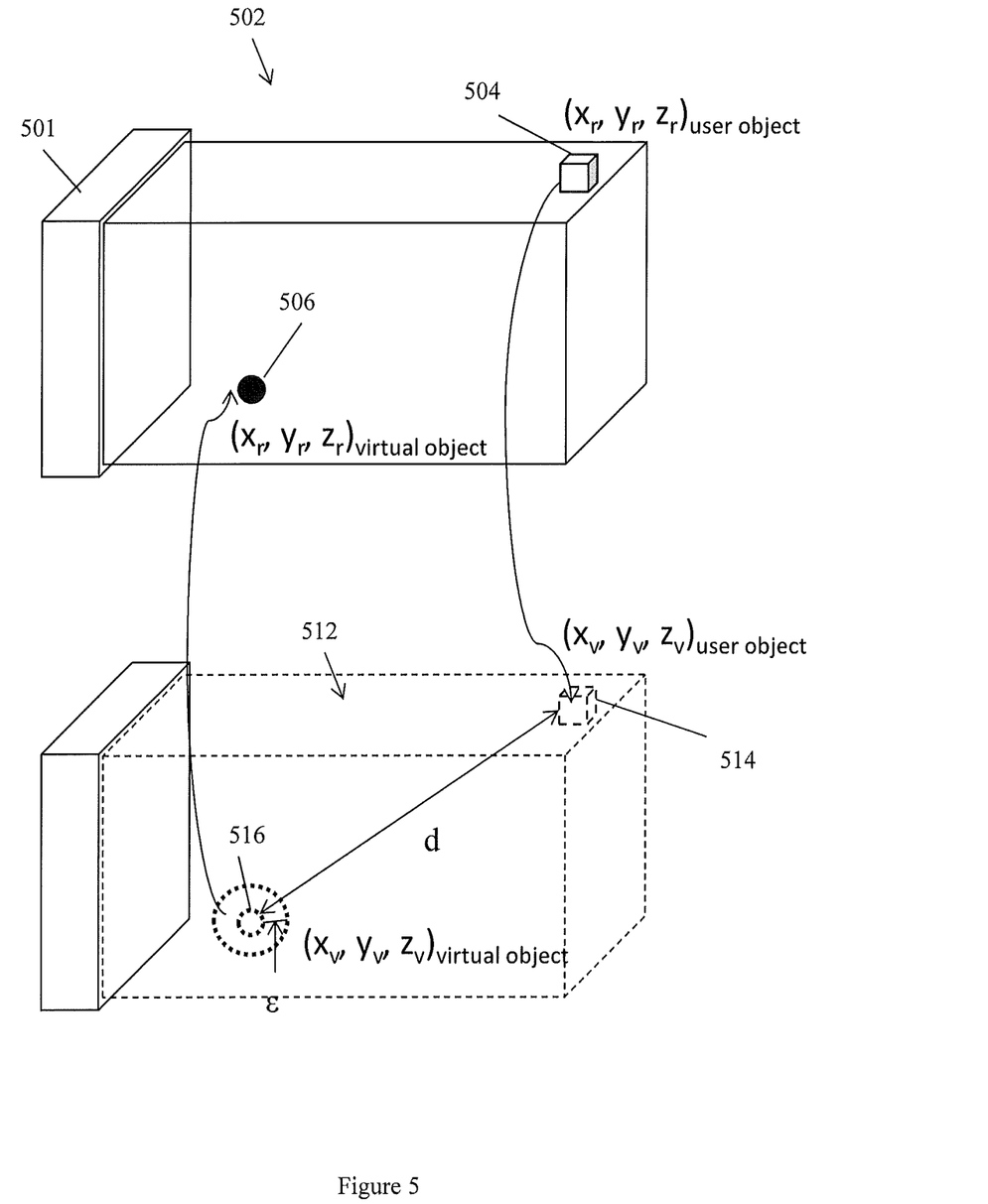
FIG. 5 illustrates a method of mapping a user object in a real space to a virtual location within the three-dimensional desktop environment in order to enable an interaction of the user with the three-dimensional desktop environment.

FIG. 5 illustrates a method of mapping a user object in a real space to a virtual location within the three-dimensional desktop environment to enable an interaction of the user with the three-dimensional desktop environment. The three-dimensional desktop environment is projected by display 501, which may be coupled to and operates under the control of a processor (such as processor 312 of FIG. 3). "Real space" 502 refers to an actual space in front of the display 501 that projects the desktop environment. The size and shape of the desktop environment may be determined by a number and configuration of ultrasonic transducers associated with the display 501. A "virtual space" 512 is a space stored in a memory location. The virtual space 512 may include virtual objects having a corresponding representation in real space. Such corresponding representation may include an image, an icon, an application, a calendar page, etc. The virtual location of such virtual objects may be included in the virtual space.

There generally exists a one-to-one correspondence between the virtual space 512 and the real space 502 so that it is possible to map a position in real space 502 to a corresponding position in virtual space 512 and vice-versa. For example, a virtual object 516 that has position $(x_v, y_v, z_v)_{virtual\ object}$ in virtual space 512 may be mapped to a position $(x_r, y_r, z_r)_{virtual\ object}$ in real space 502 at which a corresponding image 506 is projected. Also, a position of the user object $(x_r, y_r, z_r)_{user\ object}$ in real space 502 may be mapped to a corresponding position $(x_v, y_v, z_v)_{user\ object}$ of a representation 514 of the user object 504 in virtual space 512. As the user moves the user object 504 in the real space 502, transmitted and received signals from the ultrasonic transducers are used by the processor to determine the position $(x_r, y_r, z_r)_{user\ object}$ of the user object 504 in real space 502 and map this real position to the corresponding virtual position $(x_v, y_v, z_v)_{user\ object}$ of its virtual representation 514.

In addition to mapping a virtual object 516 to real space 502 and mapping a user object 504 to virtual space 512, the processor 312 may determine a relative distance d between the location $(x_r, y_r, z_r)_{user\ object}$ of the user object 504 in real space and the location $(x_r, y_r, z_r)_{virtual\ object}$ of the projected image 506 in real space 502. Processor 312 determines distance d using the virtual position $(x_v, y_v, z_v)_{user\ object}$ of the representation 514 of user object 504 and the virtual position $(x_v, y_v, z_v)_{virtual\ object}$ of the virtual object 516. When the determined distance d is less than a selected threshold value ε, the processor 312 may determine that the virtual representation 514 substantially coincides with or "touches" the selected virtual object 516. The touching of the virtual representation 514 to the virtual object 516 in virtual space 512 corresponds with the experience of the user seeing the user object 504 as "touching" the projected image 506 of the virtual object in real space 502. When the distance d between the virtual representation 514 and the virtual object 516 is greater than this selected threshold value ε, the processor 312 may determine that the virtual representation 514 is not touching the virtual object 516 and therefore that the user object 504 is not "touching" the projected image 506.

Once the user object 504 is determined to be touching the projected image 506, the user may perform a user action to select the projected image 506 and to thereby select the corresponding virtual object 516. For example, the user may depress a key or a group of keys or a sequence of keys on a keyboard to select the projected image 506. Alternatively, the user may perform an action using a mouse, a touch pad or a touch-sensitive surface of the device, such as a surface of the display 501. Alternatively, if the user object 504 is a wand or stylus or other suitable user object, the user may select a button at the user object 504 that generates a signal to the device to indicate the user's intent to select the projected image 506. Alternatively, the user may perform a gesture or a motion within the real space 502 of the desktop environment that may be interpreted at the processor 312 as the user having selected the projected image 506. In an embodiment in which the user object 504 is part of a user's hand and the user may perform a pinching motion or other suitable motion at the position of the projected image 506 to perform a "grabbing" of the projected image 506. Alternatively, the user action may include maintaining the user object 504 at the substantial position of the projected image 506 for an extended period of time, such as for longer than one second, to select the projected image 506. Various user actions may similarly be taken to deselect a projected image.

Once the user has selected the projected image 506, the user may perform a user action on the projected image 506. In various embodiments, the user may move the projected image 506 from one position in the desktop environment to another position in the desktop environment, rotate the projected image 506, increase a size of the projected image 506, decrease a size of the projected image 506, etc. In addition, the user may activate or open an application or a program by selected the projected image 506.

Figure 6:
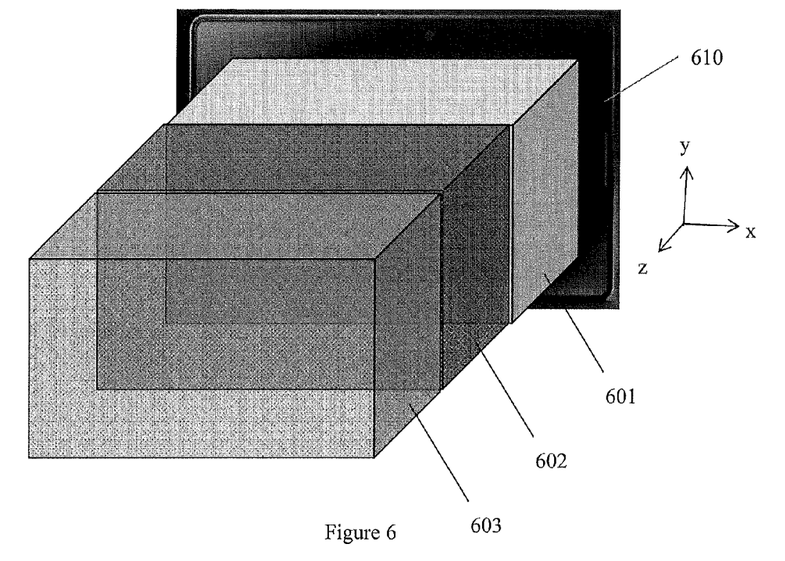
FIG. 6 shows an organizational structure of a three-dimensional desktop environment.

FIG. 6 shows an organizational structure of an illustrative three-dimensional desktop environment. The desktop environment is segmented into a plurality of illustrative "power" levels 601, 602 and 603, wherein each level spans a range of distances from the display 610 along the z-axis. The number of power levels and a spatial extent of a selected power level may be a pre-set parameter of the desktop environment such as 7 power levels or 20 power levels. Power levels may be used to organize the placement and/or importance of projected images along a z-axis of the desktop environment. Additionally, a power level may be subdivided into sub-groups or sub-volumes of the power level.

Figure 7:
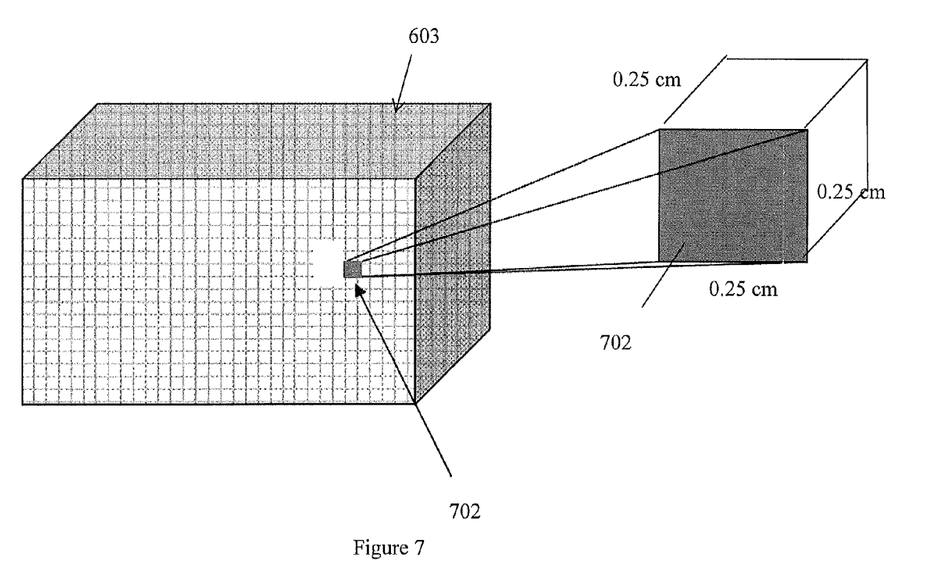
FIG. 7 shows an expanded view of a power level of the three-dimensional desktop environment.

FIG. 7 shows an expanded view of illustrative power level 603 of the three-dimensional desktop environment. The illustrative level 603 may include various pixelated volumes or pixel volumes 702. The size of a pixel volume 702 may be selected or pre-programmed at the device according to a resolution capability of the ultrasonic transducers. In the illustrative power level 603, a horizontal extent of pixel volume 702 is about 0.25 centimeters (cm), a vertical extent of pixel volume 702 is about 0.25 cm, and a thickness or depth of pixel volume 702 is about 0.25 cm. Increasing the number of ultrasonic transducers at the display (610, FIG. 6) enables smaller pixel volumes 702, thereby increasing the resolution of the power level 700. Each pixel volume 702 may be mapped to a look-up table that includes user access rights. When a user object (504, FIG. 5) enters into a selected pixel volume 702, the processor (312, FIG. 3) may access the look-up table to determine the user's access rights and may use such access rights when performing an action, such as by enabling or disabling a feature.

Figure 8:
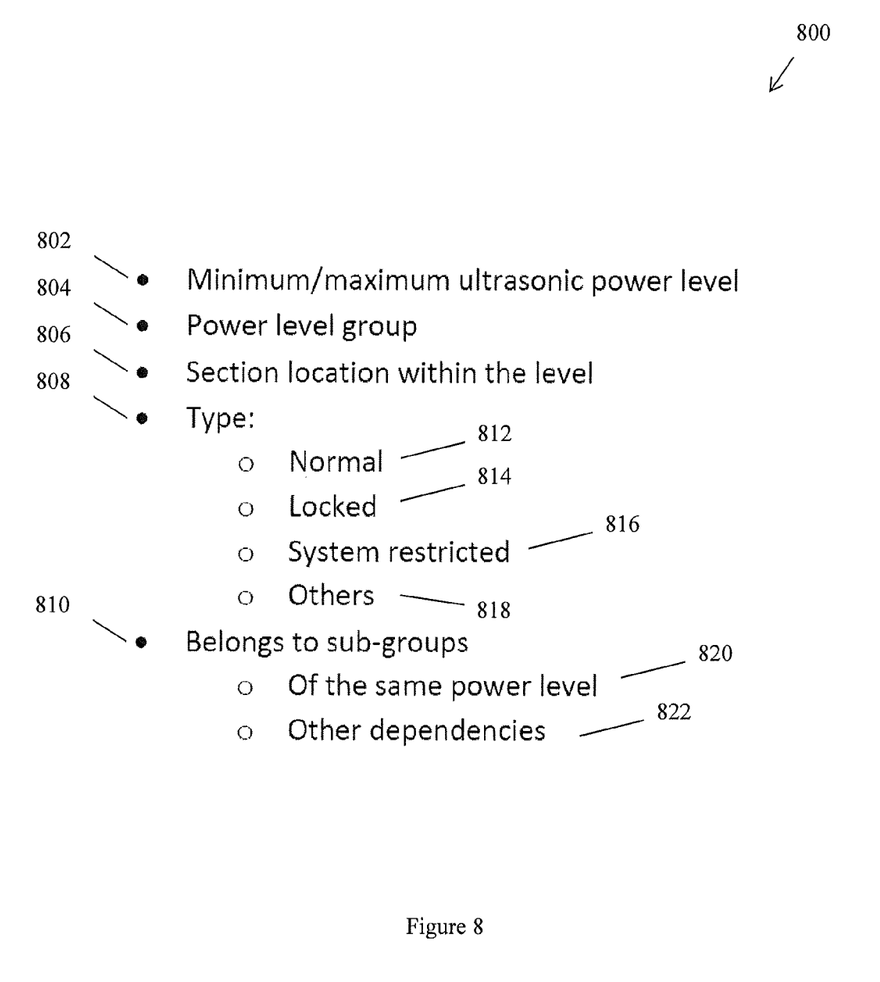
FIG. 8 shows an exemplary entry of a look-up table for a selected pixel volume of the three-dimensional desktop environment.

FIG. 8 shows an exemplary entry 800 in a look-up table for a selected pixel volume of the three-dimensional desktop environment. The look-up table entry 800 may include various fields. Field 802 indicates minimum and maximum ultrasonic power level that indicates the spatial boundaries for the pixel volume 702. Another field 804 indicates a power level to which the pixel volume belongs or is assigned. Field 806 indicates a section within the power level, i.e., horizontal and/or vertical position of the pixel volume to which the pixel volume 702 may belong.

Field 808 indicates a user rights or user access with respect to the pixel volume. User access rights may include, for example and without limitation, "Normal" 812 "Locked" 814 "System Restricted" 816 and "Others" 818. A Normal 812 access right may mean that the user is free to interact with the pixel volume. A Locked 814 access right may exclude the user from interacting with the pixel volume. For example, a power level may be locked for a given user or locked for a given application, etc. A System Restricted 816 access right may mean that the pixel volume is only for displaying system objects that are not to be tampered with by the user. An "Others" 818 access right may be a user-defined access right or application-specific access right, for example.

Field 810 indicates to which sub-groups the pixel volume may belong. A sub-group 820 may include pixel volumes within a same power level. Alternatively, a sub-group 822 may be a system-defined or user-defined group or category. Images or icons within the three-dimensional desktop environment may be grouped into the sub-group according to an affiliation with the category. For example, a sub-group may include Microsoft Office applications and their icons for Word, Excel, Powerpoint, etc. Examples of user-defined sub-groups may include icons grouped according to user's hobbies, clubs, career advancement documents, financial documents, pictures, etc. Icons in a same group may be flagged with a selected marker, such as a virtual tag, etc.

Figure 9:
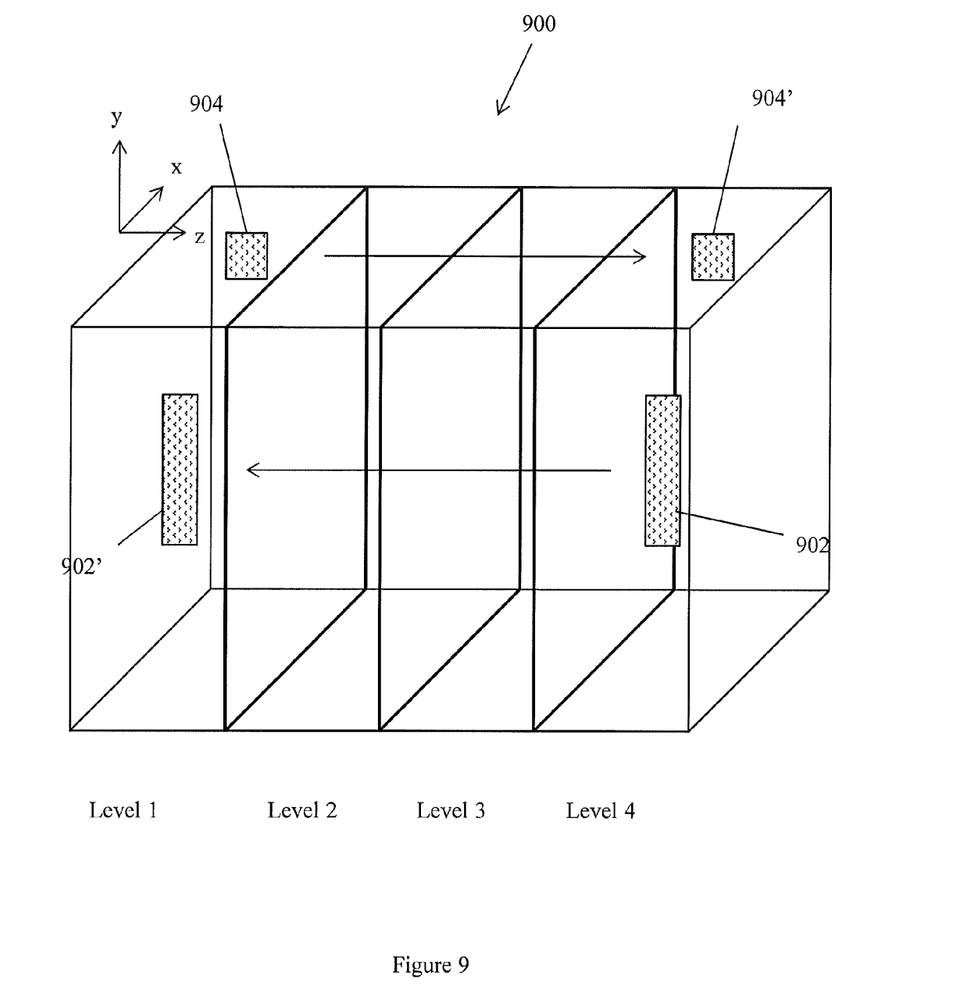
FIG. 9 illustrates the motion of a virtual object within the three-dimensional desktop environment.

FIG. 9 illustrates the exemplary motion of a virtual object within the three-dimensional desktop environment. As an element of the virtual space, a virtual object may reside within a selected power level of the virtual space, labeled as "Level 1," "Level 2," "Level 3" and "Level 4." For example, the group of icons 902 resides within power level 4 relatively further away from the display surface, and icon 904 resides within power level 1 relatively closer to the display surface. Through the method disclosed herein, a user may move icon group 902 from its location in Level 4 to a new location 902' in Level 1. Similarly, the user may move icon 904 from its location in Level 1 to a new location 904' in Level 4. For illustrative purposes, Level 2 may be a restricted level to the user. Thus, the user may be unable to move either of the icon groups 902 and icon 904 to reside at a location within Level 2. Although not explicitly illustrated in FIG. 9, it is to be understood that a virtual object may be moved horizontally (x-direction) and vertically (y-direction) as well as in the z-direction (i.e., towards and away from a display surface).

Therefore, in accordance with one aspect of the disclosure, a method of performing an action with a processor includes: generating, using the processor, a three-dimensional desktop environment and projecting the three-dimensional desktop environment into a real space; propagating an ultrasonic pulse into the real space; receiving a reflection of the ultrasonic pulse from a user object located within the real space; determining a user action of the user object using the ultrasonic pulse and the reflected ultrasonic pulse; and performing the action with the processor based on the determined user action.

In accordance with another aspect of the disclosure, an electronic device includes: a display configured to project a three-dimensional desktop environment into a real space; at least one ultrasonic transducer configured to propagate an ultrasonic pulse into the real space and receive a reflection of the ultrasonic pulse from a user object in the real space; and a processor configured to: determine a user action of a user object from the reflection of the ultrasonic pulse, and perform an action based on the determined user action of the user object.

In accordance with yet another aspect of the disclosure, an interface for providing a user interaction with an electronic device includes: a display configured to project a three-dimensional desktop environment into a real space; at least one ultrasonic transducer configured to propagate an ultrasonic pulse into the real space and receive a reflection of the ultrasonic pulse from a user object in the real space; and a processor configured to: determine a user action of a user object from the reflection of the ultrasonic pulse, and perform an action based on the determined user action of the user object.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing an action with a processor, comprising:
    generating, using the processor, a three-dimensional desktop environment and projecting the three-dimensional desktop environment into a real space, wherein the three-dimensional desktop environment is segmented into a plurality of power levels spanning a range of distances from a display along a first axis, and wherein each of the power levels comprise a plurality of pixel volumes having a horizontal extent, a vertical extent, and a depth based on a resolution capability of an ultrasonic transducer;
    propagating, using the ultrasonic transducer, an ultrasonic pulse into the real space;
    receiving, using the ultrasonic transducer, a reflection of the ultrasonic pulse from a user object located within the real space;
    determining a user action of the user object using the ultrasonic pulse and the reflected ultrasonic pulse; and
    performing the action with the processor based on the determined user action.

2. The method of claim 1, further comprising:
    projecting an image within the three-dimensional desktop environment;
    determining the user action with respect to the projected image; and
    performing the action with the processor based on the determined user action of the user object with respect to the projected image.

3. The method of claim 1, wherein determining the user action further comprises determining at least one of: (i) a perpendicular distance of the user object from the display; (ii) a position of the user object along a horizontal axis of the display; (iii) a position of the user object along a vertical axis of the display; (iv) a movement of the user object within the three-dimensional desktop environment; and (v) a gesture made by the user object.

4. The method of claim 1, further comprising using the ultrasonic transducer to determine the user action of the user object and determining a time difference between propagating the ultrasonic pulse into the real space and receiving the reflection of the ultrasonic pulse from the user object.

5. The method of claim 4, wherein the ultrasonic transducer further comprises a transmitter, a first receiver and a second receiver, the method further comprising generating the ultrasonic pulse at the transmitter and receiving the reflection of the ultrasonic pulse via at least one of the first receiver and the second receiver.

6. The method of claim 1, further comprising assigning a user right to one or more of the pixel volumes, wherein performing the action at the processor further comprises accessing the user right for the one or more of the pixel volumes.

7. The method of claim 1, wherein performing the action further comprises at least one of: moving a projected image within the three-dimensional desktop environment; enlarging the projected image; diminishing the projected image; rotating the projected image; selecting the action corresponding to the projected image; and opening a computer application associated with the selected image.

8. The method of claim 1, wherein the projected image includes a plurality of projected images that are grouped according to a category, the method further comprising performing the action with respect to the group of projected images.

9. An electronic device, comprising:
    a display configured to project a three-dimensional desktop environment into a real space, wherein the three-dimensional desktop environment is segmented into a plurality of power levels spanning a range of distances from the display along a first axis, and wherein each of the power levels comprises a plurality of pixel volumes having a horizontal extent, a vertical extent, and a depth based on a resolution capability of at least one ultrasonic transducer;
    the at least one ultrasonic transducer configured to propagate an ultrasonic pulse into the real space and receive a reflection of the ultrasonic pulse from a user object in the real space; and
    a processor configured to:
        determine a user action of the user object from the reflection of the ultrasonic pulse, and
        perform an action based on the determined user action of the user object.

10. The device of claim 9, wherein the display is further configured to project an image within the three-dimensional desktop environment and the processor is further configured to:
    determine the user action with respect to the projected image, and
    perform the action at the processor based on the determined user action of the user object with respect to the projected image.

11. The device of claim 9, wherein the processor is configured to determine the user action by determining at least one of: (i) a perpendicular distance of the user object from the display; (ii) a position of the user object along a horizontal axis of the display; (iii) a position of the user object along a vertical axis of the display; (iv) a movement of the user object within the three-dimensional desktop environment; and (v) a gesture made by the user object.

12. The device of claim 9, wherein the processor is further configured to determine the user action by determining a time difference between propagating the ultrasonic pulse into the real space and receiving the reflection of the generated ultrasonic pulse from the user object.

13. The device of claim 12, wherein the at least one ultrasonic transducer further comprises a transmitter, a first receiver and a second receiver, the processor further configured to determine the user action from a reflection of the generated ultrasonic pulse obtained via at least one of the first receiver and the second receiver.

14. The device of claim 9, wherein the processor is further configured to:
  assign a user right to one or more of the pixel volumes; and
  access the user right for the one or more pixel volumes to perform the action.

15. The device of claim 9, wherein performing the action further comprises at least one of: moving a projected image within the three-dimensional desktop environment; enlarging the projected image; diminishing the projected image; rotating the projected image; selecting the action corresponding to the projected image; and opening a computer application associated with the selected image.

16. The device of claim 9, wherein the projected image includes a plurality of projected images that are grouped according to a category, the processor being further configured to perform the action with respect to the group of projected images.

17. An interface for providing a user interaction with an electronic device, comprising:
  a display configured to project a three-dimensional desktop environment into a real space, wherein the three-dimensional desktop environment is segmented into a plurality of power levels spanning a range of distances from the display along a first axis, and wherein each of the power levels comprises a plurality of pixel volumes having a horizontal extent, a vertical extent, and a depth based on a resolution capability of at least one ultrasonic transducer;
  the at least one ultrasonic transducer configured to propagate an ultrasonic pulse into the real space and receive a reflection of the ultrasonic pulse from a user object in the real space; and
  a processor configured to:
  determine a user action of the user object from the reflection of the ultrasonic pulse, and
  perform an action based on the determined user action of the user object.

18. The interface of claim 17, wherein the display is further configured to project an image within the three-dimensional desktop environment and the processor is further configured to:
  determine the user action with respect to the projected image, and
  perform the action at the processor based on the determined user action of the user object with respect to the projected image.

19. The interface of claim 17, wherein the processor is further configured to determine the user action of the user object by determining a time difference between generating the ultrasonic pulse and receiving the reflection of the generated ultrasonic pulse from the user object.

20. The interface of claim 17, wherein each of the pixel volumes are associated with a minimum and maximum ultrasonic power level that indicates a spatial boundary for each of the pixel volumes.

* * * * *